United States Patent Office 3,536,671
Patented Oct. 27, 1970

3,536,671
DIISOCYANATES AND DERIVATIVES
Marwan R. Kamal, Dhahran, Saudi Arabia, John R. Nazy, Kankakee, Ill., and Donald H. Wheeler, Minneapolis, Minn., assignors to General Mills, Inc., a corporation of Delaware
No Drawing. Original application June 24, 1966, Ser. No. 560,112. Divided and this application Oct. 3, 1968, Ser. No. 764,921
Int. Cl. C08g 22/24
U.S. Cl. 260—77.5     10 Claims

ABSTRACT OF THE DISCLOSURE

Diisocyanates of the formula:

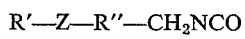

where R' is a monovalent straight chain aliphatic hydrocarbon radical containing 2 to 6 carbon atoms, R'' is a divalent straight chain aliphatic hydrocarbon radical containing 7 to 11 carbon atoms, the sum of the carbon atoms in R' and R'' is 13, and Z is a divalent radical of the structure

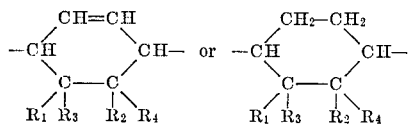

where $R_1$ and $R_2$ are H or $CH_3$ with the proviso that one of such radicals must be H and $R_3$ and $R_4$ are H or $CH_2NCO$ with the proviso that one of such radicals must be H and the other must be $CH_2NCO$. Polymers prepared by reacting the diisocyanates with compounds having at least two active hydrogen atoms as determined by the Zerewitinoff method.

---

This application is a division of Ser. No. 560,112 filed June 24, 1966.

The present invention relates to novel diisocyanates and, more particularly, to new diisocyanates derived from certain diamines ultimately prepared from conjugated fatty acid compounds and dienophiles. It also relates to polymers prepared from the new diisocyanates and compounds having at least two active hydrogen atoms.

We have now discovered a new class of diisocyanates having the idealized, general structural formula:

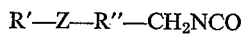

where R' is a monovalent straight chain aliphatic hydrocarbon radical containing 2 to 6 carbon atoms, R'' is a divalent straight chain aliphatic hydrocarbon radical containing 7 to 11 carbon atoms, the sum of the carbon atoms in R' and R'' is 13, and Z is a divalent radical of the structure

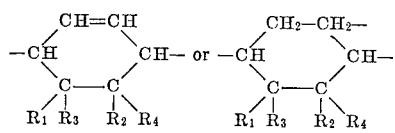

where $R_1$ and $R_2$ are H or $CH_3$ with the proviso that one of such radicals must be H and $R_3$ and $R_4$ are H or $CH_2NCO$ with the proviso that one of such radicals must be H and the other must be $CH_2NCO$.

Our new diisocyanates are preferably prepared by the reaction of certain diamines with an excess of phosgene in an inert solvent. The diamines employed have the idealized, general structural formula:

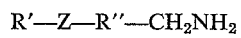

where R', R'', Z, $R_1$ and $R_2$ have the meanings set forth above and $R_3$ and $R_4$ are H or $CH_2NH_2$ with the proviso that one of such radicals must be H and the other must be $CH_2NH_2$. These diamines are in turn prepared by the hydrogenation of dinitriles of the idealized, general structural formula:

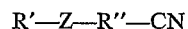

where R', R'', Z, $R_1$ and $R_2$ have the meanings set forth above and $R_3$ and $R_4$ of the radical Z are H or CN with the proviso that one of such radicals must be H and the other must be CN. The diamines are prepared from the described dinitriles by catalytic or chemical reduction of the dinitriles. Catalytic reduction is preferably accomplished by hydrogenation of the dinitrile over nickel or cobalt catalysts although certain noble metal catalysts such as palladium can also be used. The chemical reduction of the dinitriles can be accomplished using reducing agents such as lithium aluminum hydride.

The starting dinitriles are prepared in various ways. One preferred method is to first prepare an adduct of an acrylonitrile and a lower alkyl ester of a conjugated fatty acid and then convert the resulting adduct to the dinitrile by reaction with ammonia. Another preferred method is to add an acrylonitrile to a conjugated fatty acid nitrile.

A variety of conjugated fatty acids and derivatives and dienophiles can be used in the preparation of the starting dinitriles. Representative of the dienophiles are acrylonitrile, methacrylonitrile, acrylic acid, methacrylic acid, crotonic acid, the $C_1$ to $C_8$ alkyl esters of such acids, propiolactone and the like. The conjugated fatty acids used in the preparation of the dinitriles are those having two or more ethylenic bonds in the hydrocarbon chain, at least two of such ethylenic bonds being in conjugal relationship. Fatty acids containing 18 carbon atoms and two or more ethylenic bonds are commonly found in or derived from semi-drying and drying oils such as soy bean oil, tall oil, tung oil, linseed oil and the like. Specific illustrative 18 carbon atom acids are 9,12-octadecadienoic acid, 9,11-octadecadienoic acid, 10,12 - octadecadienoic acid, 9,12,15-octadecatrienoic acid (linolenic acid), 6,9,12-octadecatrienoic acid, 9,11,13 - octadecatrienoic acid (eleostearic acid), 10,12,14-octadecatrienoic acid (pseudo-eleostearic acid) and the like. Derivatives of the described fatty acids can also be used in the preparation of the dinitriles. Thus esters, such as the $C_1$ to $C_8$ alkyl esters, amides, nitriles, soaps and the like can be used. Where the fatty acid or derivative is unconjugated, conjugation of the double bonds can be effected by conventional techniques. Thus, for example, the acids and esters can be conjugated using well known alkali conjugation techniques. Also, the nitriles can be conjugated using isomerization catalysts such as alkali metal alkoxides. Similar known techniques can be used for the amides and the like.

As indicated above, our new diisocyanates are preferably prepared from the described diamines by reaction with excess phosgene in an inert solvent. Suitable illustrative inert solvents are toluene, xylene, chlorobenzene, o-dichlorobenzene and the like. The diamine is preferably added slowly to a solution of phosgene in the inert solvent. The temperature of the resulting reaction mixture is then raised to complete the reaction and distill off the excess phosgene, solvent and HCl formed by the reaction. The preparation of the new diisocyanates of our invention is further illustrated by the following examples. Said examples are to be considered as illustrative of certain preferred embodiments of the invention and are not to be considered as limiting.

EXAMPLE I (A) Dinitrile preparation

In a 2000 ml. flask fitted with thermowell, reflux condenser and addition funnel was placed 1084 g. conjugated tall oil acid nitrile (containing 34% by weight or 1.46 mole conjugated linoleonitrile). One hundred milliliters (1.5 mole) acrylonitrile (containing 0.2% by weight p-methoxy phenol) and 0.5 g. iodine were added to the nitrile and then the reaction mixture was heated to reflux. The initial reaction temperature was 133° C. and the mixture was refluxed for 50 hours during which time another 100 ml. (1.5 mole) acrylonitrile and 10.5 g. iodine were added. The reaction temperature varied during the 50 hour reaction period from 110° C. to 142° C. Small samples were withdrawn during the reaction period to observe the progress of conjugation disappearance by infrared spectral analysis. After the reaction period was completed, the product was stripped under vacuum at 90° C. to remove unreacted acrylonitrile. The residue was then distilled through a spinning band column to give 251 g. of dinitrile which boiled at 219° C./56 mm. Hg and 212° C./0.45 mm. Hg (55% yield based on starting conjugated linoleonitrile taking into account the small analytical samples withdrawn). The dinitrile had the following properties:

Nitrogen content (Kjeldahl)—8.68%
Iodine number—89.4
Refractive index $n_D^{25}$—1.4805

The calculated nitrogen content and iodine number for the dinitrile having the empirical formula $C_{21}H_{34}N_2$ are 8.91% and 80.7, respectively.

(B) Diamine preparation

In a one liter Magne-Dash autoclave was placed 230 g. of dinitrile prepared as in A above. To the dinitrile was added 196 g. anhydrous methanol and 46 g. No. 28 Raney nickel catalyst which had been washed three times with anhydrous methanol. The autoclave was sealed, purged with nitrogen and charged with 150 ml. (98 g.) liquid ammonia and hydrogen gas to bring the pressure to 1750 p.s.i. The mixture was heated at 108° C.±4° C. for 2¼ hours with hydrogen addition to maintain the pressure at 1750 p.s.i. The autoclave was cooled and discharged and the resulting solution filtered and stripped of ammonia and solvent. The crude product was distilled through a spinning band column giving 198 g. (84% yield) of diamine having the following properties:

Boiling point—202–8° C./1 mm. Hg
Refractive index $n_D^{25}$—1.4861
Amine number—334.6
Secondary and tertiary amine number—0.26
Nitrogen content (Kjeldahl)—8.57%
Iodine number—72.2

The calculated amine number and nitrogen content of the diamine of the empirical formula $C_{21}H_{42}N_2$ are 347.8 and 8.68%, respectively. The diamine was thus 96.3% pure.

(C) Diisocyanate preparation

In a two liter, 3-necked flask equipped with an ice-water cooled condenser, a stirrer and an addition funnel and submerged in a ice-salt bath were dissolved 450 g. (4.5 mole) phosgene in 800 ml. dry toluene at −2° C. The ice-salt bath was removed and the temperature of the solution was allowed to rise to 17° C. To this solution was then added slowly a solution of 166 g. (1.0 equivalent) of a diamine as prepared in B above in 150 ml. dry toluene. The addition took 20 minutes during which time the temperature of the reaction mixture rose to 37° C. A heating mantle was placed under the reaction flask and the reaction mixture was then heated slowly until the temperature of the mixture reached 77° C. (two hours heating). At this point the ice-water condenser was replaced by a tap water condenser and the temperature of the reaction mixture was allowed to rise to 110° C. A distillation head was then connected to the reaction flask and 500 ml. toluene were distilled off. Upon cooling, a viscous insoluble residue separated. The supernatant liquid was decanted and remaining solvent was removed therefrom under reduced pressure at 60° C. There was obtained 170 g. of an amber liquid. One hundred fifty grams of this liquid was distilled through a spinning band column to give 105.6 g. of a main cut of diisocyanate having a boiling point of 211–214° C./0.3 mm. Hg. The diisocyanate had the following properties:

Percent NCO—21.34
Refractive index $n_D^{25}$—1.4830
Refractive index $n_D^{30}$—1.4815

The diisocyanate consisted essentially of a mixture of unisolated isomers of the structural formulae:

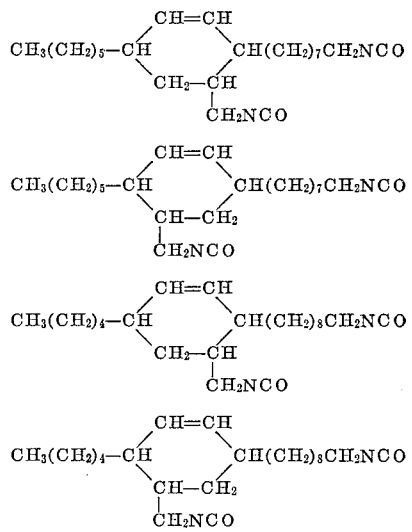

EXAMPLE II (A) Dinitrile preparation

Three hundred seventy nine grams of distilled methyl esters of tung oil acids (containing 88% by weight or 1.12 mole methyl α-eleastuarate) and 214 g. (4.04 mole) acrylonitrile (containing 0.2% by weight p-methoxy phenol) were charged into a one liter Magne-Dash autoclave. After sealing the autoclave, the pressure was raised to 1500 p.s.i. by the addition of nitrogen gas. The reaction mixture was heated to an initial temperature of 153° C. and held at 150–161° C. for four hours. It was then allowed to cool to a temperature of 25° C. over a period of 1⅓ hours at which point the pressure was gradually released. The product was filtered and then vacuum pump stripped at 90° C. There was obtained 425.5 g. of a clear yellow liquid which was then distilled through a spinning band column to give 283 grams of the monoadduct of acrylonitrile and methyl α-eleostearate (77% yield based on the conjugated methyl α-eleostearate).

A mixture of 268.5 g. (0.78 mole) of the monoadduct and 1.34 g. zinc oxide were charged into a 500 ml. round bottom flask equipped with a stirrer, thermometer, ammonia addition tube and gas trap. The mixture was heated at 275° C. as 251 g. ammonia was slowly bubbled through said mixture over a 24 hour period. The progress of the reaction was followed by subjecting small samples of the reaction mixture to infrared spectral analysis. At the end of the 24 hour reaction period, the reaction mixture was distilled through a spinning band column to give 78 g. of dinitrile boiling at 197–205° C./0.35 mm. Hg (33% yield taking into account the seven analytical samples totaling 38.2 g. withdrawn during the reaction period). The dinitrile had the following properties:

Nitrogen content (Kjeldahl)—8.70%
Refractive index $n_D^{25}$—1.4931

The calculated nitrogen content of the dinitrile having the empirical formula $C_{21}H_{32}N_2$ is 8.97%.

(B) Diamine preparation

In a one liter Magne-Dash autoclave was placed 111 g. (0.36 mole) of dinitrile prepared as in A above. To the dinitrile was added 300 ml. benezene and 33 g. of No. 28 Raney nickel catalyst which had been washed twice with anhydrous methanol and then twice with benzene. The autoclave was sealed, purged with nitrogen and charged with 110 ml. (71 g.) liquid ammonia and hydrogen gas to bring the pressure to 1500 p.s.i. The mixture was heated at 120° C. ±10° C. for 1¾ hours with hydrogen addition to maintain the total pressure above 1300 p.s.i. The autoclave was cooled and discharged and the resulting solution filtered and stripped of ammonia and solvent to give 112 g. of crude product. A 105 g. portion of the crude product was distilled through a spinning band column giving 89.5 g. (84% yield) of diamine having the following properties:

Boiling point—155–179° C./0.3 mm. Hg
Refractive index $n_D^{25}$—1.4956
Amine number—341
Secondary and tertiary amine number—0.26
Nitrogen content (Kjeldahl)—8.45%

The calculated amine number and nitrogen content of the diamine having the empirical formula $C_{21}H_{40}N_2$ are 350 and 8.74%, respectively. The diamine was thus 97% pure.

(C) Diisocyanate preparation

A diamine as prepared in B above is reacted with phosgene as in Example I(C) to yield a diisocyanate consisting essentially of a mixture of unisolated isomers of the structural formulae:

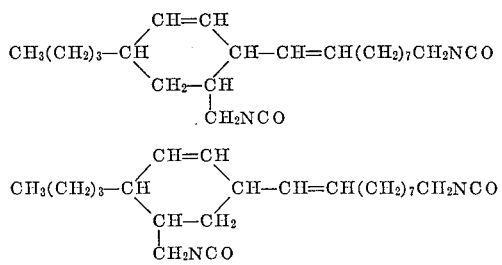

EXAMPLE III (A) Dinitrile preparation

Five hundred thirty two grams of the monoadduct of acrylonitrile and methyl α-eleostearate prepared similarly as in Example II(A) above and 26.6 g. palladium catalyst (10% on carbon) were charged into a Magne-Dash autoclave. The autoclave was sealed and the pressure raised to 1000 p.s.i. by addition of hydrogen gas. The temperature was raised from an initial 26° C. to 130° C. over a period of 25 minutes and then held at 114–132° C. over a period of 2⅓ hours with addition of hydrogen to maintain the pressure at about 1000 p.s.i. The product was then cooled to 38° C. over a 50 minute period and the pressure was gradually released. The product was washed out with chloroform, filtered twice and then the chloroform was stripped therefrom using a rotary evaporator up to 60–65° C. under a vacuum of 1.7 mm. Hg. There was obtained 519 grams of product which was distilled through a spinning band column to yield 388 g. of saturated monoadduct of acrylonitrile and methyl α-eleostearate.

Three hundred three grams of the saturated adduct (0.867 mole) and 1.515 g. zinc oxide were placed in a one liter three neck flask equipped with a stirrer and an inlet and outlet for ammonia with a cold water trap. The mixture was heated at 275° C. as 223 grams ammonia was bubbled therethrough over a period of 16 hours. The progress of the reaction was followed by subjecting small samples of the reaction mixture to infrared spectral analysis. At the end of the 16 hour reaction period, the reaction mixture was distilled through a spinning band column to give 217 g. of dinitrile having the following properties:

Nitrogen content (Kjeldahl)—8.85%
Iodine value—5.2
Refractive index $n_D^{25}$—1.1470

(B) Diamine preparation

Example II (B) was repeated using 205 g. of dinitrile prepared as in A above, 200 ml. anhydrous methanol, 30.8 g. No. 27 Raney cobalt catalyst which had been washed three times with anhydrous methanol, and 150 ml. (98 g.) liquid ammonia. The hydrogenation was carried out at 140° C. ±3° C. for 1½ hours under hydrogen at a total pressure of 1700 p.s.i. The crude product was distilled as in Example II (B) giving 196 g. (93% yield) of diamine having the following properties:

Boiling point—175° C./0.4 mm. Hg
Refractive index $n_D^{25}$—1.4812
Amine number—342.4
Secondary and tertiary amine number—0.44
Nitrogen content (Kjeldahl)—8.54%
Iodine number—7.4

The calculated amine number and nitrogen content of the diamine of the empirical formula $C_{21}H_{44}N_2$ are 345.7 and 8.63%, respectively. Thus the diamine is 96% pure as determined by amine number.

(C) Diisocyanate preparation

A diamine prepared as in B above is reacted with phosgene as in Example I(C) to yield a diisocyanate consisting essentially of a mixture of unisolated isomers of the structural formulae:

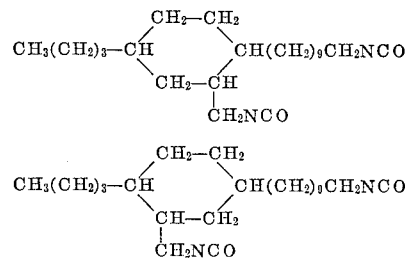

EXAMPLE IV (A) Dinitrile preparation

Into a 1000 ml. thermowell flask were charged 1.70 mole of the methyl ester of alkali conjugated linoleic acid (93% conjugated), 89 g. (1.68 mole) acrylonitrile (containing 0.2% by weight p-methoxy phenol) and 2.08 g. iodine. The mixture was heated at reflux for 37 hours during which time the pot temperature increased from 100° C. to 150° C. indicating that the reaction was 78% complete. The product was then heated under vacuum to remove unreacted acrylonitrile and distilled through a spinning band column to give a 65.5% yield of the monoadduct of acrylonitrile and the methyl ester of conjugated linoleic acid.

Three hundred thirty two grams of the monoadduct as above prepared and 1.66 g. zinc oxide were placed in a one liter three neck flask equipped with a stirrer and an inlet and outlet for ammonia with a cold water trap. The mixture was heated at 275° C. as 270 g. ammonia was bubbled therethrough over a period of 18–19 hours. At the end of the reaction period, the reaction mixture was distilled through a spinning band column to give 224 g. of dinitrile having the following properties:

Nitrogen content (Kjeldahl)—8.93%
Refractive index $n_D^{25}$—1.4797
Iodine number—79.0

(B) Diamine preparation

Example II(B) was repeated using 206 g. (0.66 mole) of dinitrile as prepared in A above, 200 ml. anhydrous methanol, 31.5 g. No. 27 Raney cobalt catalyst which had been washed three times with anhydrous methanol, and 150 ml. (98 g.) liquid ammonia. The hydrogenation was carried out at 140° C.±2° C. for 2¼ hours under hydrogen at a total pressure of 1600 p.s.i. The crude product was distilled as in Example II(B) to give 189.5 g. (90% yield) of diamine having the following properties:

Boiling point—166–174° C./0.2 mm. Hg
Refractive index $n_D^{25}$—1.4859
Amine number—348.5
Secondary and tertiary amine number—<0.4
Nitrogen content (Kjeldahl)—8.58%
Iodine number—60.0

The calculated amine number and nitrogen content of the diamine of the empirical formula $C_{21}H_{42}N_2$ are 347.8 and 8.68%, respectively.

(C) Diisocyanate preparation

A diamine as prepared in B above is reacted with phosgene as in Example I(C) to yield a diisocyanate consisting essentially of a mixture of unisolated isomers of the same structural formulae as the diisocyanate of Example I(C).

The new diisocyanates of our invention have a high boiling point and low vapor pressure at ambient conditions. They are light colored and do not show any evidence of discoloration upon storage. In addition they are characterized by low toxicity. In this respect, a diisocyanate as prepared in Example III(C) above had an acute oral toxicity value, $LD_{50}$, of 34.6 or greater.

Our new diisocyanates are particularly valuable for the preparation of polymers by reaction with compounds bearing at least two active hydrogen atoms as determined by the Zerewitinoff method. The Zerewitinoff test is described by Kohler in J. Am. Chem. Soc., 49, 3181 (1927). Such polymers are useful as coatings for a variety of substrates and for other purposes including the preparation of moldings.

In general, the active hydrogen atoms of compounds reactive with our new diisocyanates are attached to carbon, oxygen, nitrogen or sulfur atoms. Compounds containing the following groups will have active hydrogen atoms: acetamido, primary amino, secondary amino, amido, carbamyl, carboxyl, diazoamino, hydrazino, hydrazo, hydrazono, hydroxamino, hydroxyl imido, imino, isonitro, isonitroso, mercapto, nitroamino, xamyl, sulfamino, sulfamyl, sulfin, sulfo, thiocarbamyl, triazino, ureido, ureylene, and urethaneo. Most often these active hydrogen atoms are attached to oxygen, nitrogen, or sulfur atoms; thus they will be a part of groups such as —OH, —SH, —NH—, —NH$_2$, —CO$_2$H, —CONH$_2$, —CONHR where R represents an organic radical, —SO$_2$OH, —SO$_2$NH$_2$, —CSNH$_2$. Examples of suitable types of compounds include water, hydrogen sulfide, ammonia, hydroxyl polyesters, polyhydric polyalklene ethers, polyhydric polythioethers, polyacetals, aliphatic polyols, including alkane, alkene and alkyne diols, triols, tetrols and the like, aliphatic thiols including alkane, alkene and alkyne thios having two or more —SH groups; polyamines including both aromatic, aliphatic and heterocyclic diaminesfi triamines, tetramines and the like; as well as mixtures thereof. Of course, compounds which contain two or more different groups within the above-defined classes may also be used in accordance with the present invention such as, for example, amino alcohols which contain an amino group and a hydroxyl group, amino alcohols which contain two amino groups and one hydroxyl group, aminoacids and the like. Further illustrative classes and specific organic compounds containing active hydrogen atoms useful for preparing polymers according to our invention are described immediately hereinbelow.

Any suitable polyester may be used and may contain terminal hydroxyl groups, terminal carboxylic acid groups, amino groups or the like. Moreover, the polyester may be a polyester amide which was prepared by condensing an amino alcohol containing both free amino groups and free hydroxyl groups with the other components used in the preparation of polyesters. The polyester may be prepared by reacting a polycarboxylic acid or hydroxy carboxylic acid with polyhydric alcohols. It is also possible to use a mixture of polyhydric alcohols and polyamines such as ethylenediamine, polyethylenediamine, 1,4-butylenediamine and the like. Amines such as diethyl ether diamine or amino carboxylic acids such as glycine, alanine, valine, phenylalanine, hydroxyproline and the like may also be used. The polyesters may contain hetero atoms in addition to the ester groups including oxygen, sulfur, nitrogen and the like in the chain. Moreover, the radicals making up the polyester may be either saturated or unsaturated and may contain double or triple bonds as well as modifying radicals of saturated or unsaturated fatty acids such as oleic acid or fatty alcohols such as oleyl alcohol and the like.

Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid; maleic acid, fumaric acid, glutaconic acid, alpha-hydromuconic acid, beta-hydromuconic acid, alpha-butyl-alpha-ethyl-glutaric acid, alpha - beta - diethyl - succinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10 - perylenetetracarboxylic acid and the like. Any suitable polyhydric alcohol may be used such as, for example, ethylene glycol, 1,3-propylene glycol, 1,2 - propylene glycol, 1,4 - butylene glycol, 1,3 - butylene glycol, 1,2 - butylene glycol, 1,5-pentanediol, 1,4 - pentanediol, 1,3 - pentanediol, 1,6-hexanediol, 1,7 - heptanediol, glycerine, trimethylolpropane, 1,3,6 - hexanetriol, triethanolamine, pentaerythritol, sorbitol and the like.

Any suitable polyhydric polyalkyene ether may be used as the active hydrogen containing compound such as, for example, the condensation product of an alkylene oxide or of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide, and the like. Of course, the polyhydric polyalkylene ethers can be prepared 'from other starting materials such as, for example, tetrahydrofuran, epihalohydrins such as, for example, epichlorohydrin and the like as well as aralkylene oxides such as, for example styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohols such as glycerine, trimethylol propane, pentaerythritol and the like in the preparation of the polyhydric polyalkylene ethers so that some branching exists in the product. Generally speaking, it is advantageous to condense from about 5 to about 30 moles of alkylene oxide per functional group of the trihydric or higher polyhydric alcohol. The polyhydric polyalklene ethers may be prepared by any known process such as, for example, the process disclosed in 1859 by Wurtz and in Encyclopedia of Chemical Technology, volume 7, pages 257 to 262, published by Interscience Publishers, Inc. (1951), or in U.S. Pat. 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Pats. 2,862,972 and 2,900,368.

Any suitable polyhydric alcohol may be used as the active hydrogen containing compound such as, for example, alkane diols such as, for example, ethylene glycol, 1,3-propylene glycol, 1,2 - propylene glycol, 1,4 - butylene glycol, 1,3 - butylene glycol, 1,5 - pentanediol, 1,4 - butanediol, 1,3 - pentanediol, 1,6 - hexanediol, 1,7 - heptanediol, 2,2 - dimethyl - 1,3 - propanediol, 1,8 - octanediol and the like including 1,20 - eicosanediol and the like; alkene diols such as, for example, 2 - butene - 1,4 - diol, 2 - pentene - 1,5 - diol, 2 - hexene - 1,6 - diol, 2 - heptene-1,7 - diol and the like; alkyne diols such as, for example, 2 - butyne - 1,4-diol, 1,5-hexadiyne-1,6-diol and the like; alkane triols such as, for example, 1,3,6 - hexanetriol, 1,3,7 - heptane triol, 1,4,8 - octane triol, 1,6,12 - dodecane triol and the like; alkene triols such as 4 - hexene 1,3,6-triol and the like; alkyne triols such as 2 - hexyne - 1,3,6-triol and the like; alkane tetrols such as, for example, 1,2,5,6-hexane tetrol and the like; alkene tetrols such as, for example, 3 - heptene - 1,2,6,7 - tetrol and the like; alkyne tetrols such as, for example, 4 - octyne - 1,2,7,8-tetrol and the like.

Any suitable aliphatic thiol including alkane thiols containing two or more —SH groups may be used such as, for example, 1,2 - ethane dithiol, 1,2 - propane dithiol, 1,3 - propane dithiol, 1,6 - hexane dithiol, 1,3,6 - hexane trithiol and the like; alkene thiols such as for example, 2 - butene - 1,4 - dithiol and the like; alkyne thiols such as, for example, 3 - hexyne - 1,6 - dithiol and the like.

Any suitable polyamine may be used including, for example, aromatic polyamines such as, for example, p-amino aniline, 1,5-diamino naphthalene, 2,4-diamino-toluene, 1,3,5-benzene triamine, 1,2,3-benzene triamine, 1,4,5,8-naphthalene tetramine and the like; aliphatic polyamines such as, for example, ethylenediamine, 1,3-propylenediamine, 1,4-butylenediamine, 1,3-butylenediamine, diethylenetriamine, triethylenetetramine, 1,3,6-hexane triamine, 1,3,5,7-heptane tetramine and the like; heterocyclic polyamines such as, for example, 2,6-diamino pyridine, 2,4-diamino-5-aminomethyl pyrimidine, 2,5-diamino-1,3,4-thiadiazole, piperazine and the like.

One especially preferred group of amines useful for preparing polymers according to our invention are polyamines having the primary amine groups thereof blocked by ketimine or aldimine groups. The reaction of carbonyl compounds with the primary amine group can be illustrated as follows:

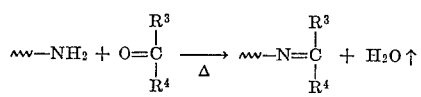

The useful carbonyl compounds may have the following theoretical structural formula:

where $R_3$ and $R_4$ are organic radicals are such substantially inert to the ketimine or aldimine formation reaction and are preferably hydrogen or short chain alkyl groups (1 to 4 carbon atoms). Preferred compounds are low molecular weight ($C_2$–$C_6$) aldehydes or ketones that are volatile so that an unreacted excess thereof may easily be removed by conventional distillation practices when the reaction is completed. Such volatile compounds are also preferred so that when the blocked polyamine is mixed with the new diisocyanate and exposed to moisture, the freed aldehyde or ketone can be easily removed from the reaction mixture. Examples of preferred carbonyl compounds include such aldehydes and ketones as acetone, methylethyl ketone, methyl-n-butyl ketone, methyl-tert-butyl ketone, ethylisopropyl ketone, acetaldehyde, propionaldehyde, butyraldehyde, isobutyraldehyde, and the like (i.e. including hexanone and hexanal). The polyamines to be blocked preferably have the structure

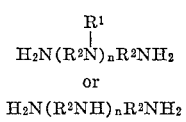

where $R^2$ is a difunctional aliphatic group containing from 2–48 carbon atoms, $R^1$ is an aliphatic group containing 1–24 carbon atoms and $n$ is an integer of from 0–20. Representative $R^1$ radicals are methyl, propyl, butyl, decyl, hexadecyl, hexenyl, octenyl, tridecenyl, octadecyl, undecynyl and the like. Inert or non-interfering groups such as Cl, nitro and the like may be present on $R^1$ and/or $R^2$.

Any suitable reaction product of a phenol with an alkylene oxide yielding a compound containing active hydrogens may be used such as, for example, those disclosed in U.S. Pat. 2,843,568, such as for example, the reaction product of hydroquinone with ethylene oxide to give a polyalkylene arylene ether glycol having a molecular weight above about 750 or other polyalkylene arylene ether glycols disclosed in said patent.

Any suitable reaction product of a phenol-aldehyde resin with an alkylene oxide may be used such as, for example, a Novolac having the formula

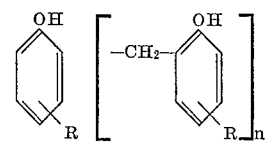

wherein $n$ is 1 to 5 and R is a lower alkyl radical such as methyl, ethyl, propyl, butyl, tertiary butyl and the like reacted with an alkylene oxide such as those disclosed above for the preparation of the polyhydric polyalkylene ethers.

Any suitable reaction product of an amine with an alkylene oxide may be used such as, for example, the reaction product of an alkylene oxide with a tolylenediamine such as, 2,4-tolylenediamine, 2,6-tolylenediamine or the like, a diphenylmethane diamine such as 4,4'-diaminodiphenylmethane or the like, xylylene diamine, as well as alkylene diamines such as, for example, ethylenediamine, propylenediamine, 1,4-butylenediamine, hexamethylenediamine and the like including 1,10-dodecane diamine.

Any suitable phenol may be used such as, for example, 2,2-bis(p-hydroxyphenyl)propane (bisphenol A) and the like.

Any suitable polyamide may be used such as, for example, those obtained by reacting adipic acid with hexamethylenediamine and the like.

Any suitable polyacetal may be used such as, for example, the reaction product of formaldehyde or other suitable aldehydes with a polyhydric alcohol such as those disclosed above for use in the preparation of the hydroxyl polyester.

Other alcohol compounds which do not necessarily fit within any of the previously set forth classes of compounds and which nevertheless contain active hydrogen containing groups which are quite suitable for the production of the polymers of the present invention are pentaerythritol, sorbitol, triethanolamine, mannitol, N,N,N',N'-tetrakis(2-hydroxypropyl)ethylenediamine, as well as compounds of any of the classes set forth above which are substituted with halogen such as, for example, chloro, iodo, bromo and the like; nitro; alkoxy, such as, for example, methoxy, ethoxy, propoxy, butoxy and the like; carboalkoxy such as for example, carbomethoxy, carbethoxy and the like; dialkyl amino such as, for example, dimethylamino, diethylamino, dipropylamino, methylethylamino and the like; mercapto, carbonyl, thiocarbonyl, phosphoryl, phosphato and the like.

Other substances which can be used include natural substances such as castor oil and the like.

The molar proportions of the diisocyanate of our invention and the compounds bearing Zerewitinoff active hydrogen atoms can vary widely. Those skilled in the art can determine the proportions of reactants best suited for a particular purpose. For example, when making polyurethane elastomers, one often uses approximately equimolar amounts of glycol and the new diisocyanate. Preferably, the active hydrogen containing compound will be used in a molar ratio to the new diisocyanate of 1:10 to 10:1.

The polymers of our invention can be prepared by reacting the new diisocyanate and the active hydrogen containing compound at subatmospheric, atmospheric or superatmospheric pressure. Atmospheric pressure is preferred. The reaction can be operated over a wide range of temperatures. Those skilled in the art will recognize that there are great differences in the relative reactivity of various groups containing active hydrogen atoms, amines reacting faster than alcohols, primary alcohols reacting faster than tertiary alcohols—to name a few examples; accordingly, one will select a temperature at which the reaction occurs at a rate convenient for the purpose at hand. Preferably, the reaction temperature ranges between about 20° C. and 150° C. However, the temperature is not critical.

If desired, the reaction may be carried out in an inert solvent. Representative solvents include tetrahydrofuran, o-dichlorobenzene, chlorobenzene, xylene, methyl isobutyl ketone, toluene and ethyl acetate. In general, the solvent should be free from isocyanate-reactable groups such as groups bearing Zerewitinoff-active hydrogen atoms.

Any catalyst which is capable of catalyzing the reaction between an active hydrogen containing compound and an isocyanate can be used in the preparation of the polymers of our invention. This includes all of the heretofore known catalysts for urethane reactions which are preferably basic organic accelerators such as, tertiary amines or non-basic metallic compounds such as those disclosed in U.S. Pat. 2,846,408 and the compounds for the catalysis of the isocyanate-hydroxyl reaction disclosed in the "Journal of Applied Polymer Science," volume IV, issue No. 11, pages 207 to 211 (1960). It is not possible to mention here each and every catalyst which is contemplated by the invention because to do so would take up too much space. It is only possible to mention some of the more important examples. The tertiary amines may be used such as hexahydrodimethyl aniline, triethyl amine, N - ethylmorpholine, N - methyl-N'-dimethyl - aminoethyl piperazine, triethylenediamine, permethylated diethylenetriamine, bis(aminoethyl) adipate, N-methyl morpholine, dimethyl cetyl amine, N,N,N',N'-tetramethyl-1,3-butylenediamine, diethylethanolamine, N-coco-morpholine, 3 - ethyl-N - dimethylpropylamine, N-dimethyl-N - methyl - isopropyl propylenediamine, N-dimethyl aminopropyl acetamide, N,N-diethyl-3-(dimethylamino)propyl amine, dimethylbenzylamine, hydramethyl morpholine, dimethyl propylamine, N,N-diethyl hydroxyethylammonium benzoate, N,N-diethylaminoethylbenzene and the like.

Any suitable metal catalyst may be used such as, for example, bismuth nitrate, lead 2-ethylhexoate, lead benzoate, lead oleate, butyl tin trichloride, stannic chloride, tributyltin cyanate, stannous octoate, stannous oleate, dibutyltin di(2-ethylhexoate), dibenzyltin di(2 - ethylhexoate), dibutyltin dilaurate, dibutyltin diisooctylmaleate, dibutyltin sulfide, dibutyltin dibutoxide, dibutyltin bis-(o-phenylphenate), dibutyltin bis(acetylacetonate), di(2-ethylhexyl)tin oxide, titanium tetrachloride, dibutyltitanium dichloride, tetrabutyl titanate, butoxytitanium trichloride, ferric chloride, ferric 2-ethyl - hexoate, ferric acetylacetonate, antimony trichloride, antimony pentachloride, triphenylantimony dichloride, uranyl nitrate, cadmium nitrate, cadmium diethyldithiophosphate, cobalt benzoate, cobalt 2-ethyl hexoate, thorium nitrate, triphenylaluminum trioctylaluminum, aluminum oleate, diphenylmercury, zinc 2-hexoate, zinc naphthenate, nickel naphthenate, molybdenum hexacarbonyl, cerium nitrate, vanadium trichloride, cupric 2-ethyl hexoate, cupric acetate, manganese 2-ethyl hexoate, manganese linoresinate, zirconium 2-ethyl hexoate and zirconium naphthenate and the like. The preferred catalysts are the tertiary amines and the organotin compounds, especially triethylenediamine, stannous octoate, stannous oleate, dibutyltin dilaurate, dibutyltin di(2-ethyl hexoate) and the like.

In the preparation of polymers according to our invention, a portion of the new diisocyanates (i.e. up to about 90 mole pervent and preferably from 0 to 50 mole percent) can be replaced by known polyisocyanates. Representative of such known polyisocyanates are ethylenediisocyanate, hexamethylenediisocyanate, butylene - 1, 3-diisocyanate, ethylidene diisocyanate, butylidene diisocyanate, 1,2,4 - butanetriisocyanate, 1,3,3 - pentanetriisocyanate, p - phenylene - 2,2'-bis(ethylisocyanate), 1,4-naphthalene-2,2'-bis(ethylisocyanate), 5 - chloro phenylene-1,3-bis(propyl-3 - isocyanate), tolylene diisocyanate, m-phenylene diisocyanate, p-phenylene diisocyanate, diphenylene-4,4'-diisocyanate, xylylene - 1,4 - diisocyanate, 4,4'-diphenylenemethanediisocyanate and the like. A particularly desirable group of polyisocyanates to be employed in combination with our new diisocyanates in the preparation of the polymers of the invention are those described in the application of Rogier and Kamal, Ser. No. 250,211, filed Jan. 9, 1963, entitled "Polyisocyanates and Derivatives," and now Pat. No. 2,455,883. These polyisocyanates are derived from polymeric fat acids and have the following idealized structural formula:

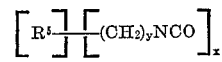

where $y$ is 0 or 1, $x$ is an integer of 2 to about 4 and $R^5$ is the hydrocarbon group of polymeric fat acids. Preferably, $x$ is 2. The polyisocyanates of the above formula wherein $y$ is 0 are prepared by converting the polymeric fat acids to the corresponding polymeric acid chlorides, reacting the acid chlorides with a metal azide to form the polymeric acyl azides and then heating the acyl azides to produce the polyisocyanates. The polyisocyanates wherein $y$ is 1 are prepared by converting the polymeric fat acids to the corresponding polynitriles and then hydrogenating the polynitriles in the presence of ammonia and a catalyst such as Raney nickel to form polyamines. The polyamines are then reacted with phosgene to give the polyisocyanates. The said polyisocyanates are further described in the noted Rogier and Kamal application which disclosure is incorporated herein by reference.

The following examples illustrate the preparation of polymers of the present invention. The said examples are not to be considered as limiting.

EXAMPLE V

A mixture of 19.8 g. diisocyanate as prepared in Example IV(C) and 8.9 g. of a ketimine blocked polyamine prepared from one mole diethylenetriamine and two moles methyl isobutyl ketone was applied as a three mil coating on glass, tin plate, black plate steel, polished cold rolled steel, granodized steel, copper and redwood panels. The coated substrates were then exposed to an atmosphere containing 30% relative humidity (ambient room temperature). The polymer was thus formed in situ on the various substrates and the coatings became tack free after 90 minutes. The coating on glass after 14 days had a Pencil hardness of 4B and a Sward Rocker hardness of 37. The coating on tin plate had a G.E. extensibility of >60%. The gloss retention of the coating on the redwood panels was good after 500 hours in a carbon arc Weather-Ometer. Adhesion of the coatings to tin plate, black plate steel, polished cold rolled steel, granodized steel and copper was excellent while there was a 73% loss of the coating from glass after 14 days. Adhesion was measured by the 100 square cross-hatch cellophane tape adhesion test. No squares were pulled from the surface of any substrate except the glass.

EXAMPLE VI

Example V was repeated except the ketimine blocked polyamine used therein was replaced with a ketimine blocked polyamine prepared from one mole bis(aminopropyl)amine and two moles methyl isobutyl ketone. The coating on glass after 14 days had a Pencil hardness of <6B and a Sward Rocker hardness of 20. The coating on tin plate had a G.E. extensibility of >60%. The gloss retention on redwood panels was good after 500 hours in a carbon arc Weather-Ometer. Adhesion, measured as in Example V, was excellent on black plate steel, polished cold rolled steel, granodized steel and copper as evidenced by no loss of squares of the coating. Glass showed a coating square loss of only 3% and tin plate a loss of 48% after the 14 day period.

EXAMPLE VII

Example V was repeated using a mixture of 2.0 g. diisocyanate as prepared in Example IV (C), 2.1 g. mineral spirits and 2.9 g. of a ketimine blocked polyamine prepared by reacting one mole diethylenetriamine with two moles methyl isobutyl ketone, the secondary amine group of the polyamine being blocked by reacting two moles of the above product with one mole of dimeryl isocyanate. The dimeryl isocyanate had the theoretical structural formula $D(CH_2NCO)_2$ where D is the dimeric fat acid radical derived from the mixture of dimerized fat acids obtained from the fat acids in tall oil consisting mainly of a mixture of dimerized linoleic and oleic acids. Coatings were applied as in Example V only to glass and tin plate which coatings had a Pencil hardness of 4B after 14 days and a G.E. extensibility of >60%, respectively.

EXAMPLE VIII

Example VII was repeated using a mixture of 9.5 g. diisocyanate as prepared in Example IV(C), 45.5 g. ketimine blocked polyamine as used in Example VII, 48.0 g. Titanox pigment RA-50 and 31.2 g. mineral spirits. Three mil coatings of the mixture were applied to various substrates and the resulting coated substrates were exposed to an atmosphere containing 50% relative humidity (72° F.). The polymer was thus formed in situ on the substrate surfaces and the coatings became tack free after 16 hours. The coating on glass after 7 days had a Pencil hardness of 4B and after 14 days had a Pencil hardness of 2B. The G.E. extensibility of the coating on tin plate was >60%. The gloss retention of the coating on granodized steel was very good after 500 hours in the carbon arc Weather-Ometer. Dry adhesion on glass, tin plate, black plate steel, polished cold rolled steel, granodized steel, copper and aluminum was good, there being less than 40% loss of coating after 14 days (measured as in Example V).

EXAMPLE IX

Example VIII was repeated using a mixture of 5.9 g. diisocyanate as prepared in Example IV(C), 2.2 g. tetrakis(2-hydroxypropyl)ethylenediamine, and 3.5 g. Cellosolve acetate:xylene (2:5 volume ratio). The three mil coatings on the glass and tin plate substrates became tack free after 48 hours. The coating on glass after 14 days had a Pencil hardness of <6B and a Sward Rocker hardness of 49. The coating on tin plate had a G.E. extensibility of >60%.

EXAMPLE X

Example IX was repeated using 19.8 g. of the diisocyanate, 7.3 g. tetrakis(2 - hydroxypropyl)-ethylenediamine, 3 drops stannous octoate and 11.7 g. of the Cellosolve acetate:xylene solvent. The coatings became tack free in 16 hours, had a Pencil hardness and Sward Rocker hardness after 14 days (on glass) of 5B and 20, respectively, and had a G.E. extensibility of >60% (on tin plate). Coatings on tin plate, granodized steel and copper had good adhesion after 14 days.

EXAMPLE XI

In a 500 ml. resin flask fitted with an air driven stirrer, nitrogen purge inlet and outlet, thermocouple and addition funnel were placed 10.75 g. (0.25 equivalent) piperazine and 75 ml. dry xylene. A solution of 47.75 g. (0.25 equivalent) diisocyanate as prepared in Example IV(C) in 30 ml. dry xylene was then added over a five minute period. The reaction temperature was gradually raised to 200° C. during which time most of the xylene distilled off. The mixture was then held under vacuum for one hour to remove residual xylene. The resulting polyurea polymer was removed from the reaction flask and molded in a Pasadena press at 390° F. to form a 0.050 in. thick sheet. The polyurea polymer had a Ball and Ring melting point of 172-5° C. The molded sheet had a yield point of 7400 p.s.i. and an ultimate tensile strength of 5440 p.s.i. at an elongation of 100% as measured on an Instron Tensile Testing Instrument, Type TT-C.

EXAMPLE XII

Example XI was repeated using 21.5 g. piperazine, 19.1 g. diisocyanate as used in Example XI, 120 g. dimeryl diisocyanate as used in the preparation of the blocked ketimine described in Example VII and a total of 150 ml. dry xylene solvent. The resulting polyurea polymer had a Ball and Ring melting point of 115-116° C., a Shore "A" hardness of 95-98 and an inherent viscosity of 0.55 as measured on a 0.5% by weight solution of the polymer in m-cresol. The molded sheet had the following properties as measured on the Instron Tensile Testing Instrument, Type TT-C:

| Specimen temp., ° C. | Ultimate tensile strength, p.s.i. | Elongation, percent | Tensile modulus, p.s.i. |
|---|---|---|---|
| 25 | 5,770 | 250 | 35,300 |
| 77 | 2,760 | 443 | |
| −25 | 7,270 | 102 | |
| −46 | 8,600 | 61 | |

The above examples show that the polymers of the present invention are highly useful as coatings for a variety of substrates and can also be used to form moldings which are strong and flexible.

It is to be understood that changes and variations may be made without departing from tht spirit and scope of the invention as defined in the appended claims.

The embodiments of the invention in which an exclu-

I claim:

1. A polymer prepared by reacting (A) a compound having at least two active hydrogen atoms as determined by the Zerewitinoff method with (B) a diisocyanate of the formula:

R'—Z—R''—CH₂NCO where R' is a monovalent straight chain aliphatic hydrocarbon radical containing 2 to 6 carbon atoms, R'' is a divalent straight chain aliphatic hydrocarbon radical containing 7 to 11 carbon atoms, the sum of the carbon atoms in R' and R'' is 13, and Z is a divalent radical of the structure

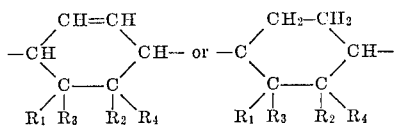

where $R_1$ and $R_2$ are H or $CH_3$ with the proviso that one of $R_1$ and $R_2$ must be H and $R_3$ and $R_4$ are H or $CH_2NCO$ with the proviso that one $R_3$ and $R_4$ must be H and the other must be $CH_2NCO$.

2. A polymer according to claim 1 wherein the active hydrogen is supplied by —OH, —SH, —NHR, —NH—, —NH₂, —CO₂H, —CONH₂, —CONHR, —SO₂OH, —SO₂NH₂, or —CSNH₂ groups where R is an organic radical.

3. A polymer according to claim 1 wherein the compound (A) is a polyamine obtained by exposing a ketimine blocked polyamine to moisture.

4. A polymer according to claim 1 wherein up to about 90 mole percent of the diisocyanate is replaced by another polyisocyanate.

5. A polymer according to claim 1 wherein Z is

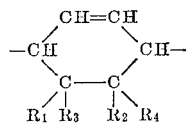

6. A polymer according to claim 5 wherein $R_1$ and $R_2$ are H and (A) is tetrakis (2-hydroxypropyl)-ethylenediamine.

7. A polymer according to claim 5 wherein $R_1$ and $R_2$ are H and (A) is a polyamine obtained by exposing a ketimine blocked polyamine to moisture.

8. A polymer according to claim 1 wherein Z is

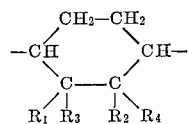

9. A polymer according to claim 8 wherein $R_1$ and $R_2$ are H.

10. A solid substrate having at least one surface thereof coated with the polymer of claim 1.

References Cited

Siefken, Liebig's Annalen der Chemie, vol. 562, p. 124 (1949).

DONALD E. CZAJA, Primary Examiner

M. J. WELSH, Assistant Examiner

U.S. Cl. X.R.

117—124, 132, 148; 260—47, 75

PO-1050
(5/69)

UNITED STATES PATENT OFFICE
CERTIFICATE OF CORRECTION

Patent No. 3,536,671                    Dated    October 27, 1970

Inventor(s)  Marwan R. Kamal, Donald H. Wheeler, John R. Nazy

It is certified that error appears in the above-identified patent and that said Letters Patent are hereby corrected as shown below:

Column 4, line 53, "α-eleastuarate" should read --α-eleostearate--.
Column 8, line 3, "diaminesfi" should read --diamines,--.
Column 10, line 1, "such" should read --each--. Column 12,
line 31, "pervent" should read --percent--; line 48, "Pat. No.
2,455,883" should read --Pat. No. 3,455,883--. Column 14, line 73,
"tht" should read --the--. Column 15, lines 15-20, that portion
of the formula reading

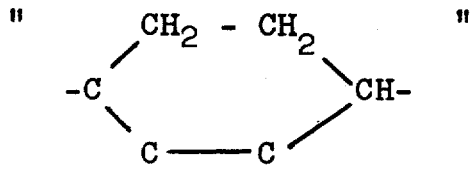

should read

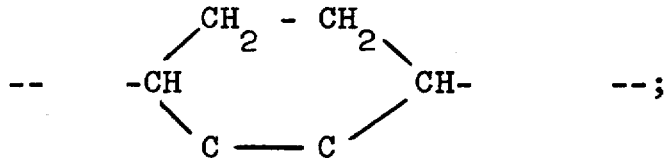

line 26, after "one" insert --of--.

Signed and sealed this 27th day of April 1971.

(SEAL)
Attest:

EDWARD M. FLETCHER, JR.
Attesting Officer

WILLIAM E. SCHUYLER, JR.
Commissioner of Patents